United States Patent
Grace (10) Patent No.: US 9,582,814 B2
(45) Date of Patent: Feb. 28, 2017

(54) LANDMARK ENHANCED DIRECTIONS

(71) Applicant: TELECOMMUNICATION SYSTEMS, INC., Annapolis, MD (US)

(72) Inventor: John Grace, Healdsburg, CA (US)

(73) Assignee: Telecommunication Systems, Inc., Annapolis, MD (US)

(*) Notice: Subject to any disclaimer, the term of this patent is extended or adjusted under 35 U.S.C. 154(b) by 0 days.

(21) Appl. No.: 14/151,551

(22) Filed: Jan. 9, 2014

(65) Prior Publication Data
US 2014/0129340 A1 May 8, 2014

Related U.S. Application Data (63) Continuation of application No. 11/241,540, filed on Sep. 30, 2005, now abandoned.

(51) Int. Cl.
  *G01C 21/34* (2006.01)
  *G01C 21/36* (2006.01)
  *G06Q 30/02* (2012.01)

(52) U.S. Cl.
  CPC ..... *G06Q 30/0265* (2013.01); *G01C 21/3476* (2013.01); *G01C 21/3644* (2013.01)

(58) Field of Classification Search
  None
  See application file for complete search history.

(56) References Cited

U.S. PATENT DOCUMENTS

| | | | |
|---|---|---|---|
| 5,084,822 A | 1/1992 | Hayami | |
| 5,508,707 A | 4/1996 | LeBlanc et al. | |
| 5,559,707 A * | 9/1996 | DeLorme et al. | 701/467 |
| 5,963,866 A | 10/1999 | Palamara et al. | |
| 6,018,659 A * | 1/2000 | Ayyagari et al. | 455/431 |
| 6,078,865 A * | 6/2000 | Koyanagi | 701/438 |
| 6,091,956 A | 7/2000 | Hollenberg | |
| 6,282,489 B1 | 8/2001 | Bellesfield et al. | |
| 6,490,522 B2 | 12/2002 | Sugiyama et al. | |
| 6,498,982 B2 | 12/2002 | Bellesfield et al. | |
| 6,510,379 B1 * | 1/2003 | Hasegawa | G01C 21/20 340/988 |

(Continued)

FOREIGN PATENT DOCUMENTS

| | | |
|---|---|---|
| DE | 199 53 398 A1 | 5/1999 |
| EP | 1 176 840 A1 | 1/2002 |

(Continued)

OTHER PUBLICATIONS http://www.magellangps.com/SmartGPS, pulled from the web on Jan. 11, 2014, 3 pgs.

(Continued)

*Primary Examiner* — Shelley Chen
(74) *Attorney, Agent, or Firm* — Tarolli, Sundheim, Covell & Tummino LLP (57) ABSTRACT

Systems and techniques to provide location-based services. In general, in one implementation, the technique includes receiving a request for directions from an initial location to a final location, determining a route from the initial location to the final location, determining one or more landmarks based on the route and providing directions for traveling the route from the initial location to the final location, the directions including a reference to the one or more landmarks.

15 Claims, 5 Drawing Sheets

(56) References Cited

U.S. PATENT DOCUMENTS

| | | | |
|---|---|---|---|
| 6,542,812 B1 | 4/2003 | Obradovich et al. | |
| 6,609,005 B1 | 8/2003 | Chern | |
| 6,810,323 B1 | 10/2004 | Bullock et al. | |
| 6,868,410 B2 | 3/2005 | Fortin et al. | |
| 7,039,640 B2 | 5/2006 | Miller et al. | |
| 7,110,773 B1 | 9/2006 | Wallace et al. | |
| 7,259,668 B2 | 8/2007 | Casey | |
| 7,286,931 B2 * | 10/2007 | Kawasaki | G01C 21/3682 342/357.31 |
| 7,440,875 B2 * | 10/2008 | Cuthbert et al. | 703/2 |
| 7,684,928 B2 * | 3/2010 | Kodani | G01C 21/32 340/995.12 |
| 7,756,639 B2 | 7/2010 | Colley et al. | |
| 7,899,468 B2 | 3/2011 | Lohtia et al. | |
| 7,957,751 B2 | 6/2011 | Cone | |
| 2002/0065604 A1 * | 5/2002 | Sekiyama | G01C 21/3476 701/426 |
| 2002/0072848 A1 * | 6/2002 | Hamada et al. | 701/211 |
| 2002/0120397 A1 * | 8/2002 | Kepler | 701/209 |
| 2002/0173905 A1 | 11/2002 | Jin et al. | |
| 2003/0009281 A1 * | 1/2003 | Whitham | 701/211 |
| 2003/0036848 A1 * | 2/2003 | Sheha et al. | 701/209 |
| 2003/0114171 A1 | 6/2003 | Miyamoto | |
| 2003/0167120 A1 * | 9/2003 | Kawasaki | G01C 21/3682 701/426 |
| 2003/0182056 A1 * | 9/2003 | Nozaki | G01C 21/26 701/426 |
| 2004/0132465 A1 | 7/2004 | Mattila et al. | |
| 2004/0198386 A1 | 10/2004 | Dupray | |
| 2004/0198397 A1 | 10/2004 | Weiss | |
| 2004/0203866 A1 | 10/2004 | Sahinoglu et al. | |
| 2004/0203903 A1 | 10/2004 | Wilson et al. | |
| 2004/0229601 A1 | 11/2004 | Zabawskyj et al. | |
| 2005/0049785 A1 | 3/2005 | Vergin | |
| 2005/0051623 A1 * | 3/2005 | Okuda | G09B 29/106 235/384 |
| 2005/0137994 A1 | 6/2005 | Fortin et al. | |
| 2005/0249172 A1 | 11/2005 | Malik | |
| 2005/0278114 A1 | 12/2005 | Ahmad | |
| 2005/0288859 A1 | 12/2005 | Golding et al. | |
| 2006/0004631 A1 * | 1/2006 | Roberts | G06Q 30/02 705/14.57 |
| 2006/0089792 A1 * | 4/2006 | Manber et al. | 701/207 |
| 2006/0259237 A1 | 11/2006 | de Silva et al. | |
| 2006/0265737 A1 | 11/2006 | Morris | |
| 2007/0032942 A1 * | 2/2007 | Thota | 701/200 |
| 2007/0061073 A1 | 3/2007 | Kuo et al. | |
| 2007/0191029 A1 | 8/2007 | Zarem et al. | |
| 2008/0045232 A1 | 2/2008 | Cone | |
| 2008/0262714 A1 * | 10/2008 | Ettinger | 701/201 |
| 2008/0262717 A1 * | 10/2008 | Ettinger | G01C 21/3476 701/467 |

FOREIGN PATENT DOCUMENTS

| | | |
|---|---|---|
| EP | 1 239 392 A2 | 2/2002 |
| GB | 2 363 289 A | 12/2001 |

OTHER PUBLICATIONS

Shou-De Lin, et al.: *"Exploiting a Search Engine to Develop More Flexible Web Agents"*; wi, pp. 54, 2003 IEEE/WIC International Conference on Web Intelligence (WI'03), 2003.
"Yahoo! Maps," http://maps.yahoo.com/, 1 pg.
"Google Maps," http://maps.google.com/, 1 pg.

* cited by examiner

LANDMARK ENHANCED DIRECTIONS

The present invention is a continuation application of U.S. Ser. No. 11/241,540, filed 30 Sep. 2005, herein incorporated by reference in its entirety.

FIELD OF THE INVENTION

This specification describes systems and methods for location-based services.

BACKGROUND

Systems and methods for providing directions using landmarks are described. Typical navigation systems provide directions for traveling a route in terms of street names. For example, MapQuest.com generates step-by-step directions for traveling from a given initial location to a given final location. Street names are sometimes difficult to notice, especially if a user is traveling in an automobile. Furthermore, if the user is focused on following step-by-step street name directions, it may be difficult for the user to notice landmarks while en route.

SUMMARY

This disclosure generally describes systems and methods for providing directions using landmarks.

In one aspect, a request is received for directions from an initial location to a final location. A route is determined from the initial location to the final location. One or more landmarks are determined based on the route and directions are provided for traveling the route from the initial location to the final location, the directions including a reference to the one or more landmarks.

In another aspect, an initial location and a final location are received. A plurality of routes between the initial location and the final location are determined. For each of the plurality of routes, one or more landmarks at one or more direction points included in the route are determined. A route is selected from the plurality of routes, the selecting based on the determined one or more landmarks for each of the plurality of routes.

Implementations may include one or more of the following features. Information can be provided to a server and one or more landmarks can be received from the server. A landmark can be a branded reference point. A branded reference point can include one or more of the following: a place of business, a commercial sign, or an advertisement. A request can be received from a user and the initial location can be a current location of the user. A request can be received from a location-aware device and the initial location can be the current location of the location-aware device.

A query can be received and a search can be performed based on the query, where a search result can comprise the final location. A final location can be a name of a physical location referring to one of: a place, a geographic area, an event, or a historical site. Directions can include one or more of the following: step-by-step instructions for traveling the route from the initial location to the final location or a graphical representation of a map identifying the route from the initial location to the final location. Directions can be provided as voice prompts or an animated map. Promotional information associated with the one or more landmarks can be obtained and provided. A web page associated with the promotional material can be presented. Promotional material can be forwarded. A consumer transaction based on the promotional material can be initiated.

A landmark can be determined based at least in part on a user profile. One or more landmarks can be determined based on one or more of the following: a rank of the landmark, a rank of a promotion associated with the landmark, a time of day, a date, a relevancy of the landmark, or a relevancy of a promotion associated with the landmark. A geographic location corresponding to a final location can be determined. A graphical display of a map including the route and the one or more landmarks, identified on the map or step-by-step directions for traveling the route from the initial location to the final location including a reference to the one or more landmarks can be provided. A route can be chosen that has the greatest number of landmarks in a plurality of routes. A route can be chosen that has the greatest number of landmark of a specified type.

Implementations of the invention can realize one or more of the following advantages. A user can navigate to a final location with the aid of easy to spot landmarks, instead of solely relying on street names which can be, at times, difficult to read and/or notice. The user can also easily learn of promotions associated with a given landmark en route or near to the user's final location. A landmark can also be associated with multimedia components describing the landmark's characteristics, profile, features, and the like.

These general and specific aspects may be implemented using a system, a method, or a computer program, or any combination of systems, methods, and computer programs. The details of one or more implementations of the invention are set forth in the accompanying drawings and the description below. Other features, aspects, and advantages of the invention will be apparent from the description and drawings, and from the claims.

DESCRIPTION OF DRAWINGS

Like reference symbols in the various drawings indicate like elements.

DETAILED DESCRIPTION

A system and methods for providing user directions for traveling from an initial location to a final location, where the directions include explicit references to landmarks and, optionally, promotions associated with the landmarks are described.

Figure 1:
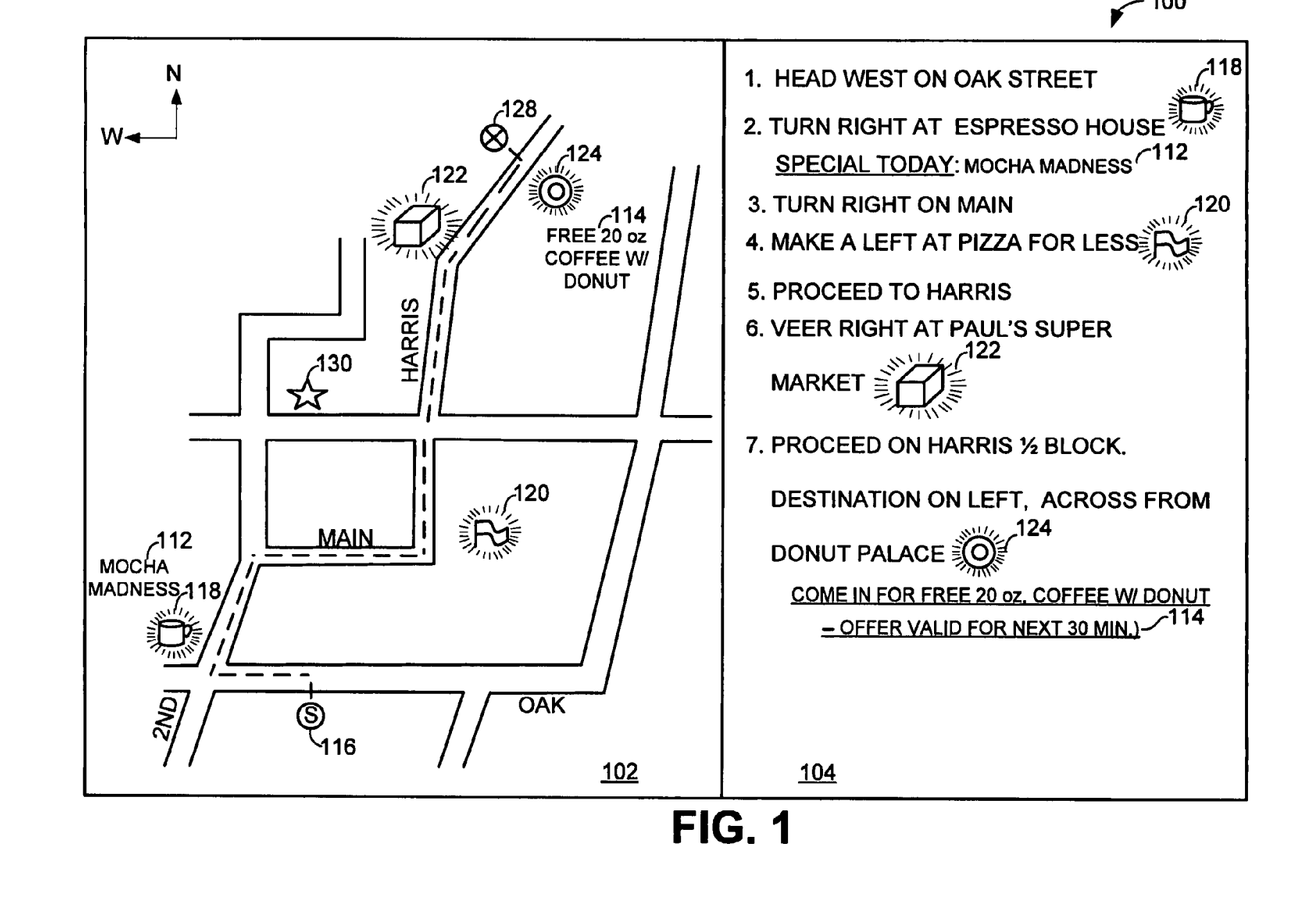
FIG. 1 shows an exemplary graphical user interface for showing directions using landmarks.

FIG. 1 is a screen shot 100 showing a graphical user interface for an application that provides directions for travel from an initial location 116 to a final location 128. Although a graphical user interface is illustrated, other user interfaces can be used in systems and methods for providing directions, including user interfaces that allow for user interaction by means of sound, voice, gesture, eye movement and/or use of remote control devices. The user interface can be provided on a number of devices including, but not limited to, devices such as a cell phones, personal data assistants, hand-held Global Positioning System (GPS) based navigation systems, automobile navigation systems, personal computers, combinations thereof, and other suitable navigation systems.

In one implementation, the user interface can present one or more views of information. By way of illustration, a map view 102 presents a street map of a route showing the initial location 116 and final location 128, as well as landmarks (118, 120, 122, and 124) along the route. A directions view 104 presents step-by-step directions that a user can follow from the initial location 116 to reach the final location 128. In one implementation, an outlying landmark 130 does not lie directly on the route. For example, such an outlying landmark can be in a general area surrounding a point on the route or within a predefined proximity to the route. In this case, the outlying landmark 130 need not be used for guiding the user along the route, but can be pointed out to the user nonetheless in either view.

A landmark is an entity having a physical presence (e.g., a building, a sign, a sculpture, an entity that is perceptible through vision, touch, or sound) that the user will encounter while traveling a route dictated by the directions. In one implementation, a landmark is a branded reference point that designates a place of business or the location of at least one business, commercial signage, or an advertisement. In one implementation, symbols or marks (e.g., trademarks) representing landmarks can be included in the map view 102 and/or the directions view 104. In an aspect of this implementation, landmark symbols (118, 120, 122, and 124) in the directions view 104 correspond to like symbols in the map view 102.

In one implementation, the initial location 116 is specified as a street address. In another implementation, the initial location 116 is the current location of the user as determined by a location-aware device (e.g., a cell phone). In yet another implementation, the initial location 116 can be specified as the name of a business, a place, an event (e.g., Giant's baseball game), or a location that the user will travel from at some point in the future. Likewise, the final location can be specified as an address, the name of a business or place, a geographic area, an event, and a landmark.

The initial location and/or the final location can also be specified as a proximity query. A proximity query specifies a location in terms of a search of an area surrounding a location and, optionally, for a given type of landmark. For example, a user may request directions to the nearest Italian restaurant from an initial location. A search of a points of interest database 204 (see FIG. 2) including restaurants can be performed based on the query, and the search result can be used as the final location.

In one implementation, a proximity query can be based on a location, a type of landmark, and a qualifier. The type of landmark is used to create a result set of possible landmarks in a region surrounding the location. By way of a non-limiting illustration, the type of landmark could be a type of cuisine (i e., in the current example, Italian food), a type of business (i.e., in the current example, a restaurant), and other suitable landmark types. The qualifier is used to specify which landmark in the result set should be chosen as the result. Qualifiers can include, but are not limited to, nearest (as in the current example), furthest, lowest rated, highest rated, least expensive and most expensive.

An unrestricted proximity query can also be used to specify more than one initial and/or final location. An unrestricted proximity query omits the type of landmark and/or the qualifier. For example, if the qualifier is omitted from the query, instead of finding the location of the nearest Italian food, it will find all such locations within a region surrounding the given location. By way of a further illustration, a user may request an initial location of San Francisco, Calif. and a final location of New York, N.Y. In this case, the user can be presented the option of choosing a route to follow from all possible routes between the San Francisco and New York. In yet a further illustration, the user may specify a specific initial location but leave the final location general (i.e., specifying the final location as an unrestricted proximity query).

Referring again to FIG. 1, the first exemplary direction (1) in the directions view 104 instructs the user to "Head West on Oak St." The next direction (2) instructs the user to turn right at the "Espresso House" landmark. Notice that the coffee cup symbol 118 in direction (2) refers to the same symbol in the map view 102. A user traveling the route according to the directions will encounter the "Espresso House" establishment and therefore know to make a right turn at that point. This type of navigation can be more efficient for a user, especially a user operating a vehicle, than having to rely on hard-to-read street signs.

In one implementation, promotions or other information can be associated with a landmark and brought to the user's attention through various means. By way of illustration, a "promotion" can be information associated with a landmark, or a special offer enticing the user to visit the landmark or conduct business at the landmark or with an entity associated with the landmark. Information can include multimedia components describing a landmark's characteristics, profile, features, and the like. The map view 102 and directions view 104 can present promotions. In one implementation; the map view 102 landmark symbols that represent landmarks offering promotions, i e., landmarks 118 and 124, can be made to stand out visually by changing their appearance, and/or by presenting the associated promotion adjacent to the landmark symbol or elsewhere. For example, "Mocha Madness!" is displayed adjacent to landmark 118, and "Free 12 oz Coffee w/Donut" is displayed adjacent to landmark 124.

In the directions view 104, a promotion can be incorporated into the directions themselves. For example, direction (2) includes a promotion 112. In this example, the promotion 112 is displayed as the phrase "special today", which is a link a user can select (e.g., by highlighting and clicking a mouse). When the promotion 112 or associated landmark symbol, i.e., Espresso House 118, is selected by the user, the user can be provided with more information about the promotion. In one implementation, the user can be directed to a web page including information about the promotion 112. In another implementation, the user can enter into a consumer transaction, such as making an Internet purchase under the terms of the promotion 112. In yet another implementation, the user can forward the promotion 112 to an email address, an instant messenger buddy, a mobile phone via Short Message Service or other suitable service.

Referring again to the directions view 104, directions (3) and (5) do not include a reference to a landmark. However, directions (4) and (6) each include a reference to a landmark (i.e., "Pizza for Less" and "Paul's Supermarket") without an associated promotion. Direction (7) includes a reference to the "Donut Palace" landmark 124 and an associated promotion 114. In this case, the promotion is time sensitive and is only valid for the next 30 minutes. In one implementation, a time sensitive promotion can include an animated countdown timer. For example, the text "30 min." in promotion 124 can count down as time passes (e.g., "29 min.," 28 min.," . . . "1 minute left!").

In another implementation, a promotion can be displayed in the map view 102 and/or the directions view 104 based on the user's proximity to a landmark. For example, if the user interface is presented on a mobile, location-aware device, a promotion can be presented to the user as the user nears a landmark. In another aspect, a landmark and/or a promotion in the map view 102 or the directions view 104 can be visually emphasized (e.g., highlighted, animated, enlarged) as the user's current location nears that landmark.

Figure 2:
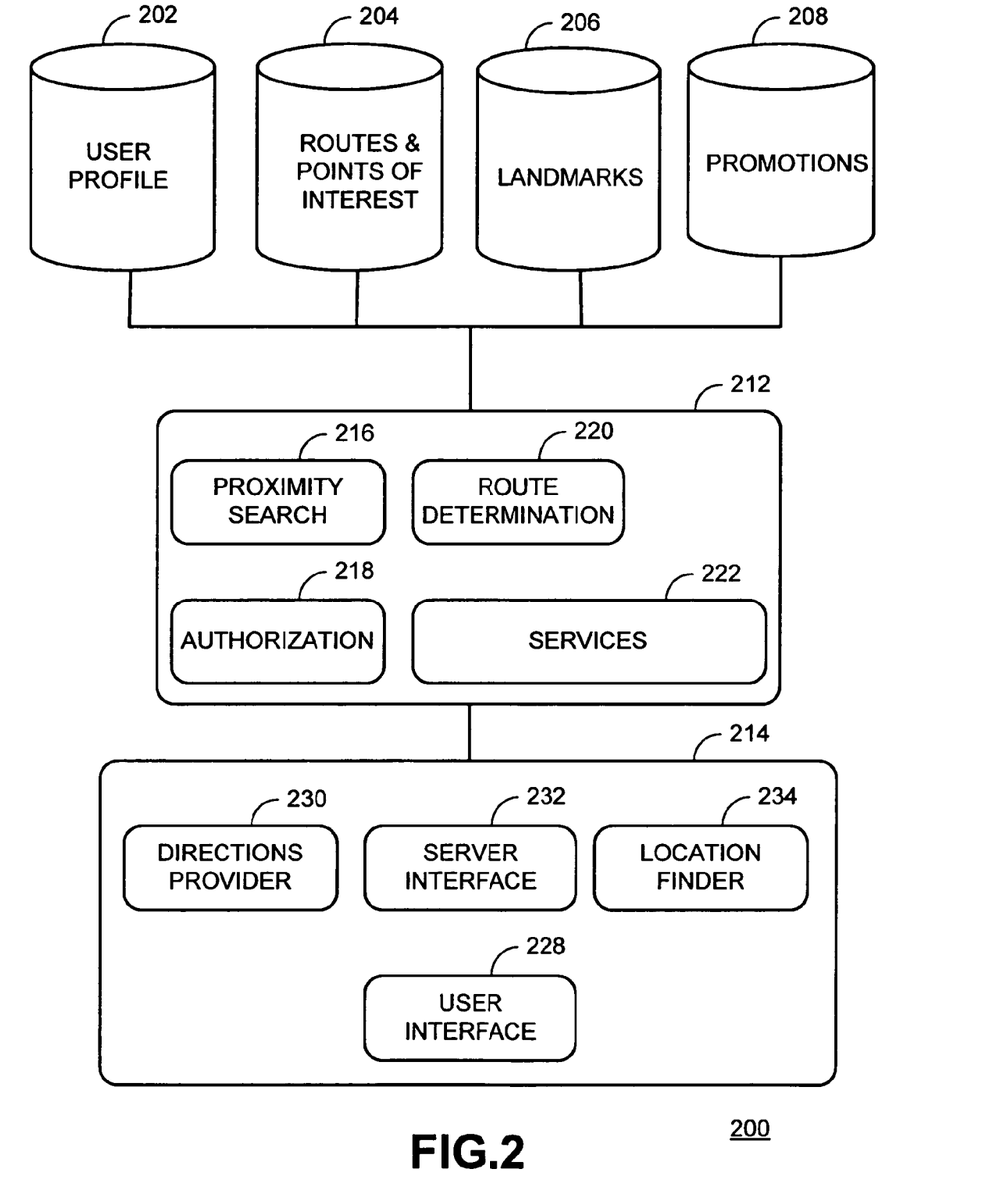
FIG. 2 is a schematic representation of a system for generating directions including landmarks.

Referring to FIG. 2, one implementation of a system 200 for providing a route map and/or directions using landmarks is illustrated. In this implementation, the system includes a client 214, a server 212 and databases accessible by the server 212. Other configurations of the system 200 are possible, and the configuration shown is merely one example.

The client 214 includes a user interface 228 for interfacing with a user, a directions provider component 230 for providing a route map and/or directions to the user interface 228, a server interface 232 for determining a route, directions, associated landmarks and associated promotions by communicating with a server 212. In one implementation, the client 214 also includes a location finder component 234 capable of determining the current location of the client 214, which current location can serve as the initial location in a direction request made to the server 212.

The server 212 includes a services component 222 for responding to requests from the client 214. In one implementation, the client 214 is authorized by an authorization component 218 included at the server 212 before the client 214 is permitted to access the services 222. For example, some clients may be not be authorized to access a location service based on an associated user's service plan or profile. In one implementation, the client 214 provides the server 212 with a request for directions between specified initial and final locations. In another implementation, the final location is specified as a proximity search and the proximity search component 216 is used to resolve the query to a final location. A route determination component 220 determines a route between the initial and final locations. The route determination component 220 can use one or more of the following strategies, without limitation: minimize travel distance, minimize travel time, maximize landmarks included en route, maximize landmarks with high ratings, maximize landmarks with promotions, maximize routes with particular characteristics (e.g., whether or not a route contains ferries, bridges, or other characteristics).

A route determination component 220 determines a route between the initial and final locations, e.g., the initial location 116 and final location 128 shown in FIG. 1, and a generates a set of directions to guide a user when traveling the route. In one implementation, the route determination component 220 determines the route by accessing a route and landmark database 204 (or more then one such databases) including digital map data, points of interest and other landmarks. Navteq of Chicago, Ill. and Tele Atlas of Lebanon, N.H. are examples of providers of digital map databases that provide routing information as well as points of interest databases including locations of points of interest such as gas stations, hotels, shops and hospitals, to name a few. The route and landmark database 204 can be built from digital map data acquired from one or more digital map databases, such as those provided by Navteq and Tele Atlas described above. Additionally, the database 204 can include supplemental landmark information that is not included in typical, commercially available digital map databases. For example, the database 204 can be augmented with the location of the retail outlets of a particular company.

The route determination component 220 can query the route and landmark database 204 to determine one or more routes between the initial and final locations 116, 128, and to determine one or more landmarks included en route, as well as at "direction points". A direction point is a point along the route where the user is notified of a change of direction. For example, the geographic location of the Espresso House 118 is a direction point, as the user must turn right at this point to travel the selected route to the final location 128. The route determination component 220, uses the landmarks included in the route and landmark database 204 to determine one or more landmarks located at the direction point. The route determination component 220, chooses at least one of the determined landmarks to include within the directions, in this example, the Espresso House 118.

At a given intersection, there may be multiple landmarks, for example, a different business or other landmark may be located on each of four corners of the intersection. The route determination component 220 can select landmarks for a given route based on a multitude of factors such as, but not limited to, the rank of a landmark, the rank of a promotion, the current time of day, the date, and/or the relevancy of the landmark/promotion. In one implementation, the rank of a landmark/promotion is based on the compensation amount the landmark owner is willing to provide the server 212 in order for the landmark/promotion to be included in the directions to travel the route. For example, the more compensation the landmark owner is willing to pay, the higher the rank of the landmark/promotion. In another implementation, the rank can be based the popularity of the landmark/promotion with a class of users including the user requesting the directions. The class of users can be determined based on demographic information, user profiles, or other information used to classify users for the purposes of studying behavior. Popularity can be related to how frequently users in the class visit the landmark or select a promotion associated with a landmark.

In one implementation, the relevancy of a landmark/promotion can be determined based on user profile information for the user requesting the directions. The route determination component 220 can obtain and use user preferences from a user profile database 202 in determining a route. For a given user, the user profile database 202 can include without limitation, the user's age, weight, height, gender, address, occupation, dietary habits, dietary restrictions, annual income, martial status, the type of vehicle the user drives, and stores the user frequents. For example, if it is known that a user is vegetarian, only restaurant landmarks that accommodate vegetarians would be included in a route. Or, if the route will be traveled early in the morning, it would not make sense to select landmarks that are offering dinner promotions. In one implementation, the user can rate a landmark and this information can be included in the user's profile. In an aspect of this implementation, landmarks with higher ratings are more likely to be included in directions to travel a route than those landmarks with lower ratings. In another implementation, the user can save a given landmark so the landmark can be quickly selected as a final location in the future. Saved landmarks can also be stored in the user profile database. In one implementation, a user's profile information can be supplied as part of the request made to the server 212, in which case the user profile database 202 can be eliminated.

Figure 3:
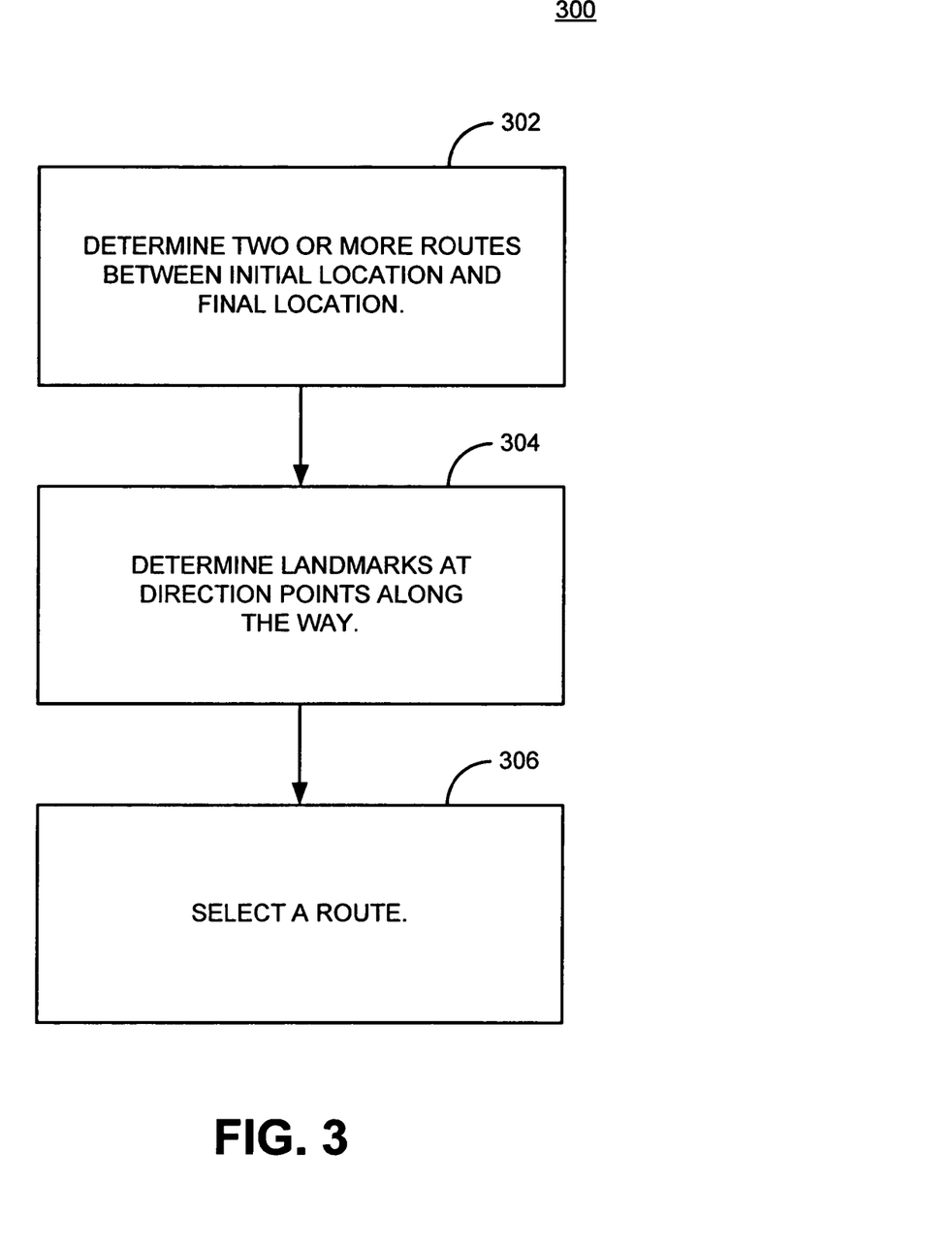
FIG. 3 is a flow chart illustrating a process for determining a route.

Referring to FIG. 3, in one implementation the route determination component 220 can determine two or more routes between the initial location 116 and the final location 128 from information provided by the route and landmark database 204 (step 302). The route determination component 220 can then make a decision as to which route to present to the user. The decision can be based on a number of factors. In one implementation, the user can influence the factors (e.g., based on the user's profile). In one implementation, the route determination component 220 determines landmarks at direction points along each route, and optionally, with a predefined proximity to the route and/or initial and final locations 116, 128 (step 304). The route determination component 220 selects the route to present to the user based on the determined landmarks (step 306). For example, the route determination component 220 may select a route to maximize the number of landmarks along the route. Alternatively, the route determination component 220 may select a route to maximize the number of a certain type (e.g., restaurant type, or historical type) of landmarks along the route. There are any number of possible ways of the route determination component 220 to make the selection based on the determined landmarks, and the those described are merely exemplary.

Referring again to FIG. 2, the operations described can be implemented by more or fewer components, including more or fewer at the server 212 server and/or the client 214, and entirely by the server 212 or entirely by the client 214, with or without access to external databases. In another implementation, the server 212 and/or the client 214 components can be distributed across two or more computing devices connected by a network, shared memory or other suitable means of sharing information.

Figure 4:
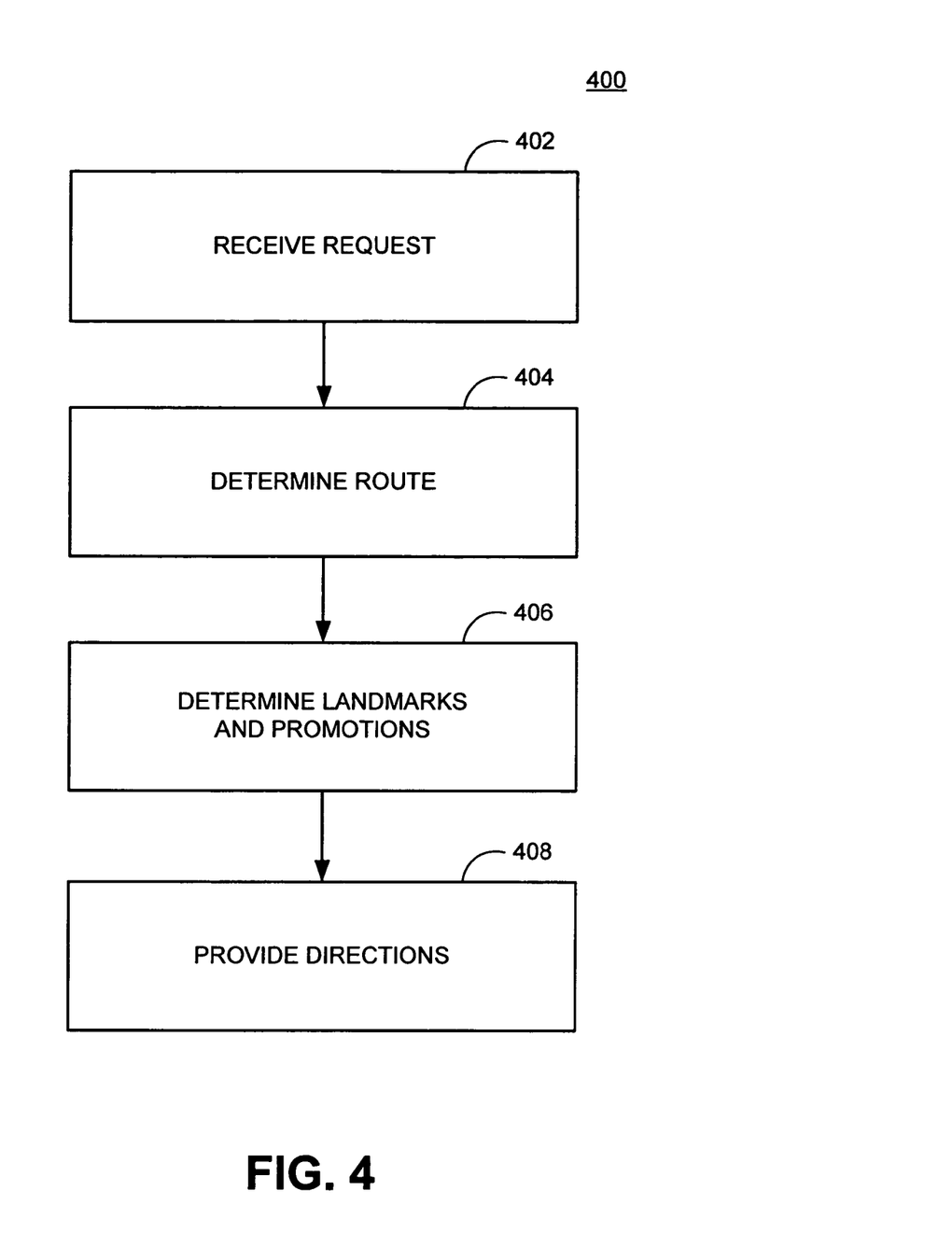
FIG. 4 is a flow chart illustrating a process for providing directions including landmarks.

Referring to FIG. 4, a flow chart is shown illustrating a process 400 for providing landmark-enhanced directions to a user. The system receives a request (e.g., via user the user interface 228) for directions from an initial location to a final location (step 402). For example, the initial location can be initial location 116 shown in FIG. 2, and the final location can be final location 128. In one implementation, the initial location is the current location of the user, which can either be specified by the user, or determined by a device or a process. In another location, the initial location is specified by the user and is unrelated to the current location of the user. The system provides the initial and final locations 116, 128 to a process for providing directions. In response, the process provides the directions to travel a route between the initial and final locations 116, 128 (step 404), landmarks along the route and, optionally, promotional material related to the landmarks (step 406). Directions are provided to the user (e.g., using the user interface component 228) which can include, but is not limited to, a directions view 104 and/or a map view 102 (step 408).

Figure 5:
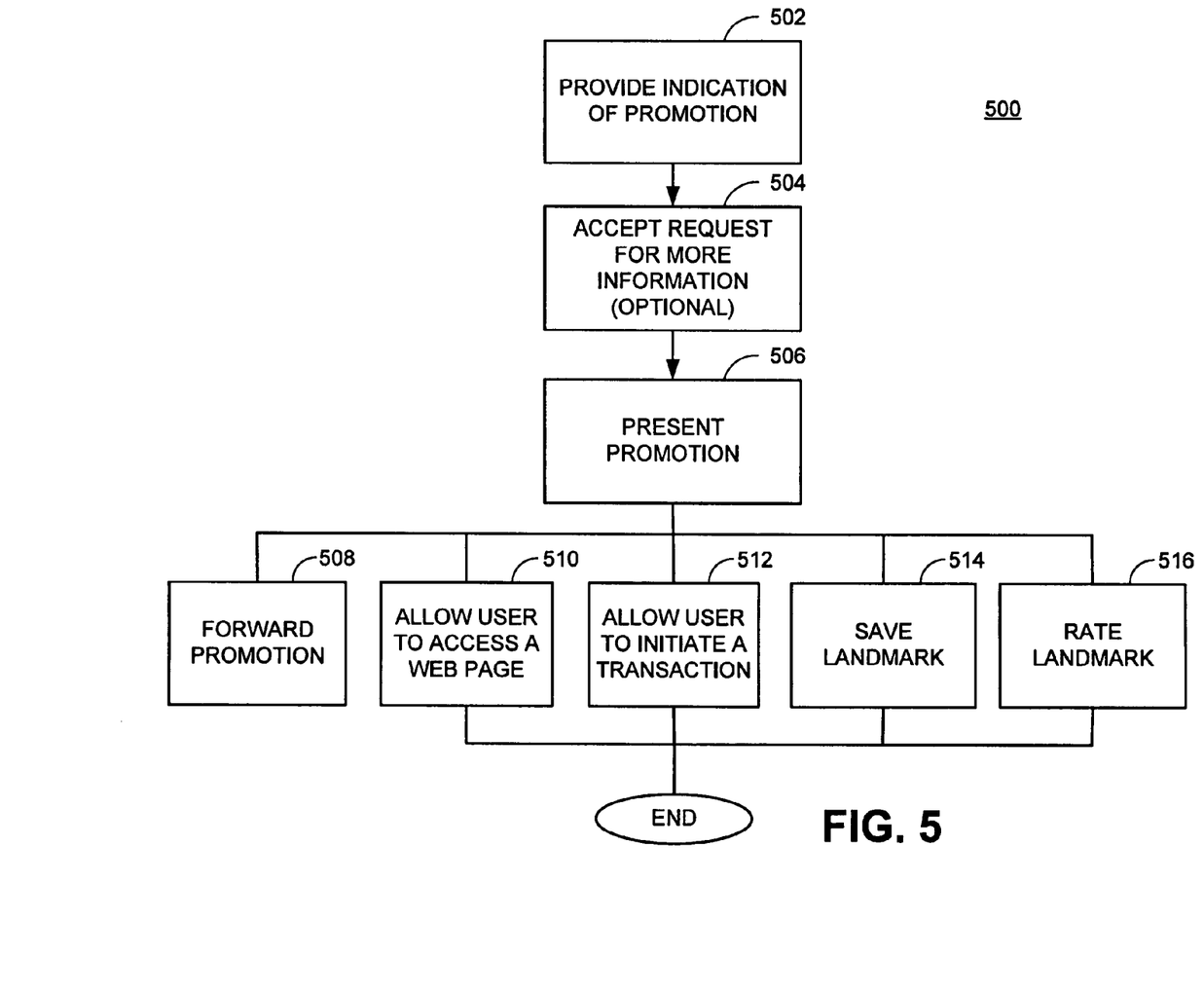
FIG. 5 is a flow chart illustrating a process for providing information pertaining to a landmark included in directions using landmarks.

Referring to FIG. 5, a flow chart is shown illustrating a process 500 for providing promotions to the user. The user interface 228 provides an indication as discussed with reference to FIG. 1 that a promotion is available (step 502). A user indicates to the through the user interface 228 that more information about a promotion is desired (step 504). Step 504 is optional, as the user interface 228 can automatically display the promotion. The promotion is presented to the user through the user interface 228 (step 506). The user can then interact with the promotion in a number of ways (steps 508, 510, 512, 514 and 516). The user can forward the promotion to an email address, an instant messenger, and/or any other suitable communication medium (step 508). The user can also access a web site associated with the promotion (step 510). The user can initiate a consumer transaction (step 512), save the landmark for future reference (step 514), and/or rate the landmark (step 516).

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementation of the invention have been described. Nevertheless, it will be understood that various modifications may be made without departing from the spirit and scope of the invention. For example, the steps of the invention can be performed in a different order and still achieve desirable results. Accordingly, other implementations are within the scope of the following claims.

What is claimed is:

1. A non-transitory computer readable medium having machine executable instructions, the machine executable instructions comprising:
   a route determination component configured to:
      determine a plurality of routes between an initial location and a final location in response to a request from a given user;
      identify landmarks positioned near each of the plurality of routes based on a user profile that characterizes personal features of the given user; and
      select a route from the plurality of routes that has a greatest number of identified landmarks positioned near the route; and
   a navigation system configured to generate a graphical user interface (GUI) for traveling the route, wherein the GUI comprises:
      a map view configured to output a map depicting a first subset of the route, wherein the map view includes icons on the map representing the identified landmarks positioned near the first subset of the route, wherein the map view further includes another icon representing an outlying landmark on the map that is off the route; and
      a directions view configured to output text characterizing directions for traveling a second subset of the route, wherein the directions view includes the icons representing the identified landmarks.

2. The non-transitory computer readable medium of claim 1, wherein the first subset of the route and the second subset of the route are the same subsets of the route.

3. The non-transitory computer readable medium of claim 2, wherein the first subset of the route and the second subset of the route are the entire route.

4. The non-transitory computer readable medium of claim 1, wherein the first subset of the route and the second subset of the route are different subsets of the route.

5. The non-transitory computer readable medium of claim 1, wherein a given landmark of the identified landmarks is positioned near an intersection of two streets on the map in the map view.

6. The non-transitory computer readable medium of claim 1, wherein a given icon of the icons is shaped to characterize a respective landmark of the identified landmarks.

7. The non-transitory computer readable medium of claim 6, wherein the given icon is shaped as a trademark of a business corresponding to the respective landmark.

8. The non-transitory computer readable medium of claim 6, wherein the map view and the directions view includes an advertisement associated with the respective landmark.

9. The non-transitory computer readable medium of claim 8, wherein the advertisement is a limited time promotional offer and the advertisement includes information characterizing an amount of time remaining for which the limited time promotional offer is still valid.

10. The non-transitory computer readable medium of claim 8, wherein the advertisement in the directions view includes an actuatable element that is configured to provide detailed information characterizing the advertisement in response to actuation.

11. The non-transitory computer readable medium of claim 10, wherein the advertisement in the map view includes an actuatable element that is configured to provide detailed information characterizing the advertisement in response to actuation.

12. A navigation system comprising:
   a route determination component configured to:
      generate a plurality of routes between an initial location and a final location in response to a request from a given user;
      identify landmarks positioned near each of the plurality of routes based on a user profile that characterizes personal features of the given user; and
      select a route from the plurality of routes that has a greatest number of identified landmarks positioned near the route; and
   a graphical user interface (GUI) comprising:
      a map view configured to output a map depicting a first subset of the route, wherein the map view includes icons on the map representing the identified landmarks positioned near the first subset of the route, wherein the map view includes an outlying landmark on the map that is off the route; and
      a directions view configured to output text characterizing directions for traveling a second subset of the route, wherein the directions view includes the icons representing the landmarks, wherein the map view and the directions view are output concurrently.

13. The system of claim 12, wherein a given icon of the icons is shaped as a trademark of a business corresponding to a respective landmark of the identified landmarks.

14. The non-transitory computer readable medium of claim 1, wherein identifying landmarks positioned near each of the plurality of routes is based on at least one personal feature of the personal features of the given user, wherein the personal features comprises information characterizing a given user's age, weight, height, gender, address, occupation, dietary habits, dietary restrictions, annual income, martial status, a type of vehicle the given user drives and stores the given user frequents.

15. The non-transitory computer readable medium of claim 1, wherein identifying landmarks positioned near each of the plurality of routes is based on each personal feature of the personal features of the given user, wherein the personal features comprises information characterizing a given user's age, weight, height, gender, address, occupation, dietary habits, dietary restrictions, annual income, martial status, a type of vehicle the given user drives and stores the given user frequents.

* * * * *